United States Patent
Dixon et al.

(10) Patent No.: US 7,762,688 B2
(45) Date of Patent: Jul. 27, 2010

(54) LUMINAIRE COMPRISING A SPOTLIGHT AND ADJUSTABLE HOLDING DEVICE FOR A SPOTLIGHT

(75) Inventors: Roderick Dixon, Newton Aycliffe (GB); Katharina Goetz-Schäfer, Bad Salzfluten (DE); Martin Bergmann, Vienna (AT); Harald Gründl, Vienna (AT); Gernot Bohmann, Vienna (AT)

(73) Assignee: Zumtobel Lighting GmbH & Co. KG (DE)

( * ) Notice: Subject to any disclaimer, the term of this patent is extended or adjusted under 35 U.S.C. 154(b) by 303 days.

(21) Appl. No.: 11/816,207
(22) PCT Filed: Feb. 17, 2006
(86) PCT No.: PCT/EP2006/001470

§ 371 (c)(1),
(2), (4) Date: Nov. 5, 2007

(87) PCT Pub. No.: WO2006/087216

PCT Pub. Date: Aug. 24, 2006

(65) Prior Publication Data

US 2008/0158894 A1     Jul. 3, 2008

(30) Foreign Application Priority Data

Feb. 18, 2005   (DE) ........................ 10 2005 007 711

(51) Int. Cl.
*F21V 21/30* (2006.01)
(52) U.S. Cl. ..................... 362/287; 362/419; 362/427
(58) Field of Classification Search ............. 362/287, 362/404, 418, 419, 421, 427, 648
See application file for complete search history.

(56) References Cited

U.S. PATENT DOCUMENTS 4,414,613 A    11/1983   Mayer (Continued)

FOREIGN PATENT DOCUMENTS

| DE | 632879 | 7/1936 |
|---|---|---|
| DE | 691569 | 5/1940 |
| DE | 4004499 A1 | 8/1991 |

OTHER PUBLICATIONS

International Search Report for PCT/EP2006/001470. Mailed Apr. 27, 2006.

*Primary Examiner*—Stephen F Husar
*Assistant Examiner*—Peggy A. Neils
(74) *Attorney, Agent, or Firm*—The H.T. Than Law Group

(57) ABSTRACT

The invention relates to a lamp (1) comprising a projector (3) and an adjustable holding device (5), by means of which the projector (3) is joined to a base part (2) of the lamp (1). The holding device (5) is provided with an elongate support element (6), a holding element (7) at least for part of the projector (3), a joint (8) between the support element (6) and the holding element (7), and a clamping device (9) for locking the joint (8). The joint (8) and the clamping device (9) are disposed in a projector housing (11). In order to ensure that the projector (3) is easy to handle for adjustment purposes, a removing mechanism (41), with the aid of which the clamping force of the clamping device (9) can be reduced or canceled, is arranged in the projector housing (11). Said removing mechanism (41) is accessible from outside the projector housing (11) in order to be manually manipulated while being provided with a manually actuated actuating element (42) which is located at a distance next to a supporting element (49) that is fixed to the housing. The actuating element (42) can be moved towards the supporting element (49) by having two fingers of an operator's hand engage over both elements (42, 49).

19 Claims, 3 Drawing Sheets

U.S. PATENT DOCUMENTS

| | | | |
|---|---|---|---|
| 4,935,855 A * | 6/1990 | Narita | 362/286 |
| 5,341,276 A * | 8/1994 | Shen | 362/648 |
| 5,450,303 A * | 9/1995 | Markiewicz et al. | 362/419 |
| 5,593,224 A | 1/1997 | Kunkel et al. | |
| 5,788,518 A * | 8/1998 | Wachter et al. | 439/121 |
| 6,079,992 A | 6/2000 | Kuchar et al. | |

\* cited by examiner

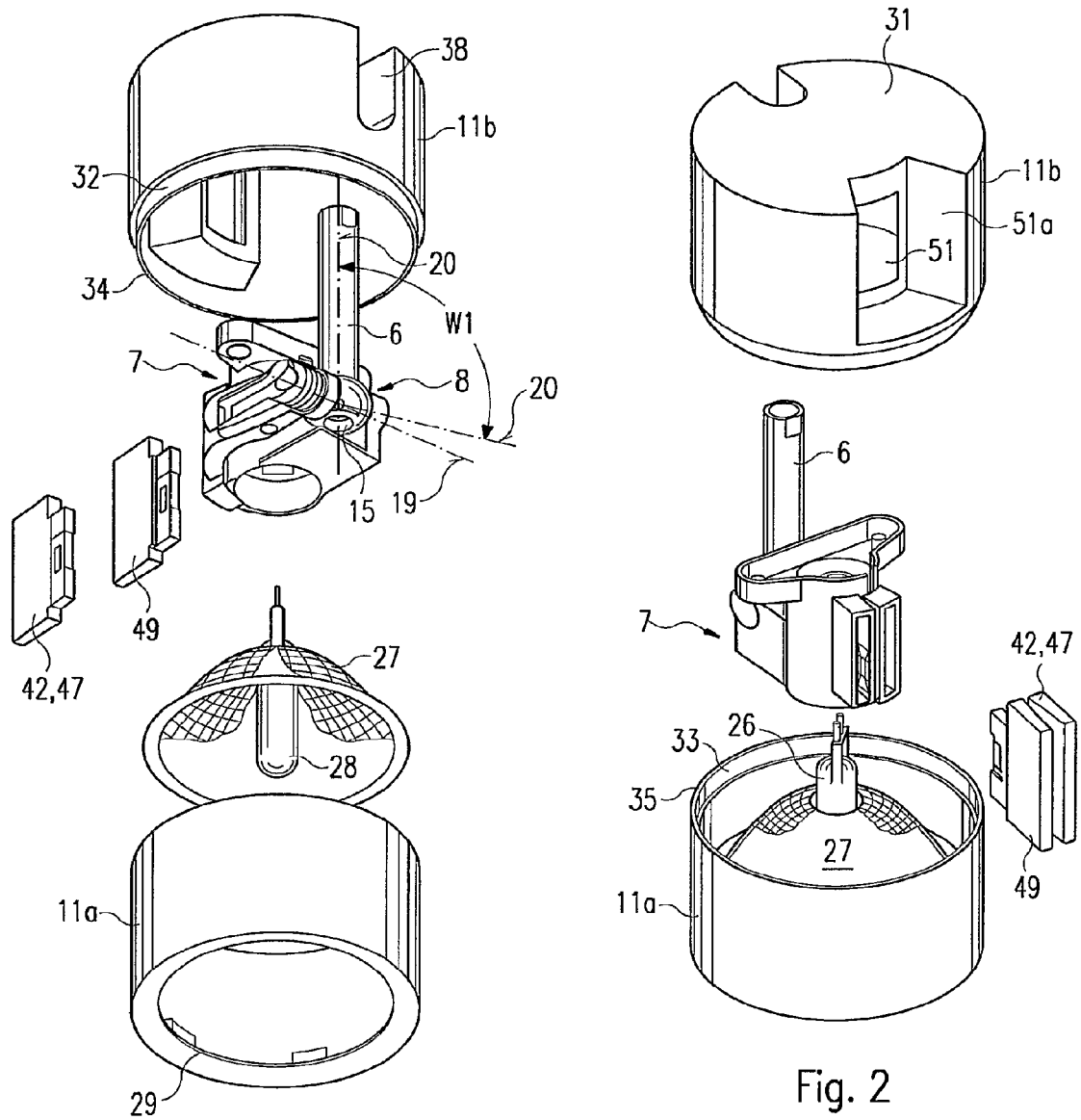

LUMINAIRE COMPRISING A SPOTLIGHT AND ADJUSTABLE HOLDING DEVICE FOR A SPOTLIGHT

FIELD OF THE INVENTION

The invention relates to a luminaire comprising a spotlight and an adjustable holding device for a spotlight.

BACKGROUND OF THE INVENTION

Known in the art, in the case of luminaires comprising a spotlight, and unlike the case of luminaires installed in a fixed manner, is the practice of holding the spotlight by means of a holding device which comprises an articulated joint disposed between, on the one hand, a carrying element attached to a base part and, on the other hand, a holding element for at least a portion of the spotlight. A clamping device is associated with the articulated joint for the purpose of locking the latter, such that the clamping force is sufficient to lock the spotlight in the set position. Depending on the magnitude of the clamping force that is present, it is possible, in the case of such a clamping device, to adjust the spotlight by manually applying pressure to overcome the clamping force of the clamping device. This, however, requires a manual expenditure of force which may overload the clamping device and, in addition, a relatively large amount of frictional wear occurs in the case of such an adjustment.

Known from U.S. Pat. No. 6,079,992 is a spotlight luminaire of the generic type in which the clamping device can be released by means of a release device. This release device can be actuated by means of an outwardly projecting lever, in which case, however, it is necessary to keep hold of the spotlight with the other hand.

SUMMARY OF THE INVENTION

The invention is now based on the object of designing a luminaire according to the preamble of claim 1 or a holding device according to the preamble of claim 4 in such a way that it can be adjusted with easy manipulation.

This object is achieved by the features of claim 1 or 4. Advantageous developments of the invention are described in associated sub-claims.

In the case of the luminaire according to claim 1, there is disposed in the spotlight housing a release device which can be used to reduce or remove the clamping force of the clamping device, the release device being accessible from outside the spotlight housing in order that it can be operated manually. It is thereby possible, through manual operation, to remove the clamping force of the clamping device, or at least to reduce it to such an extent that it is possible to adjust the spotlight with easy manipulation in a manner that does not damage the clamping device or the articulated joint. This design thus enables the spotlight to be adjusted with easy manipulation in a non-damaging manner. A long service life is thus achieved, because wear is prevented or at least reduced.

The particular ease of manipulation is achieved, according to the invention, in that manual operation of the release device can be effected directly from outside the spotlight housing. This is effected by means of an actuating element which is accessible from the outside and is disposed, for example, in an aperture of the spotlight housing, said actuating element being such that it can be manually gripped and actuated in a direct manner, and being disposed at a distance next to a supporting element which is solid with the housing. This design makes it possible to grip both elements, for example with two fingers of the operating hand, and thereby to move the actuating element into its release position, towards the supporting element. In so doing, it is possible to adjust the spotlight at the same time, such that no special access is required.

In the case of the design according to the invention as stated in claim 4, the articulated joint additionally permits adjustment about at least two axes, means being provided for manually releasing the clamping device without use of tools only for the time of adjustment of the articulated joint. This design is also advantageous if the holding device is not disposed in a housing. This design, likewise, is distinguished by ease of manipulation, the clamping device being releasable by direct manual operation only for the time of adjustment, such that, following the manual release, the clamping device becomes operative automatically and locks the articulated joint.

Suitable for the designs according to the invention is a ball-and-socket joint, which is spatially adjustable about any number of axes and provides for a large adjustment range. A sufficient adjustment range with sufficient adjustment possibilities is also achieved if the articulated joint permits adjustment about only two axes. These axes may run, for example, at right angles to one another, as is the case with a ball-and-socket joint, the ball of which is mounted between two laterally mutually opposing articulated-joint shells and which can be clamped, by lateral pressure, on to at least one of the two articulated-joint shells. This clamping force can be achieved in a simple manner by a spring, in particular a compression spring. In the case of such a clamping device, moving the compression-loaded articulated-joint shell contrary to the spring force causes the clamping device to be released. This can be effected with use of an appropriate means, e.g. a release device.

A luminaire of the present type is also subject to requirements in respect of its appearance, since it is intended for use in rooms frequented by people. For this reason, it is advantageous for the holding device for the spotlight to be disposed in a housing to such an extent that the articulated joint and the clamping device are accommodated in the housing, and are thus taken out of view.

The invention is therefore furthermore based on the object of designing a luminaire according to the claims of the present invention in such a way that a simple structure is achieved, while ensuring that the radiation of light can be set in a manner appropriate to the room.

This object is achieved by the claims of the present invention. Advantageous developments of the invention are described in associated sub-claims.

In the case of the luminaire according to claims of the present invention, the carrying element extends through a slot in the spotlight housing, said slot, being continuous in a side wall of the spotlight housing, extending as far as into a top wall of the spotlight housing that faces away from the radiation directions of the spotlight. This design is simple because it requires only a slot in the spotlight housing in order to achieve sufficient adjustment of the spotlight. In this case, an adjustment range is achieved which extends as far as two radiation directions which are directed at right angles to one another and which between them enclose an approximately right angle or, also, obtuse angle.

BRIEF DESCRIPTION OF THE DRAWINGS

Advantageous designs of the invention are explained more fully in the following with reference to a plurality of exemplary embodiments and drawings, wherein:

FIG. 2 shows the spotlight in a so-called exploded drawing of its partially disassembled parts;

FIG. 3 shows the spotlight in a position rotated by approximately 180°;

DETAILED DESCRIPTION OF THE INVENTION

Figure 1:
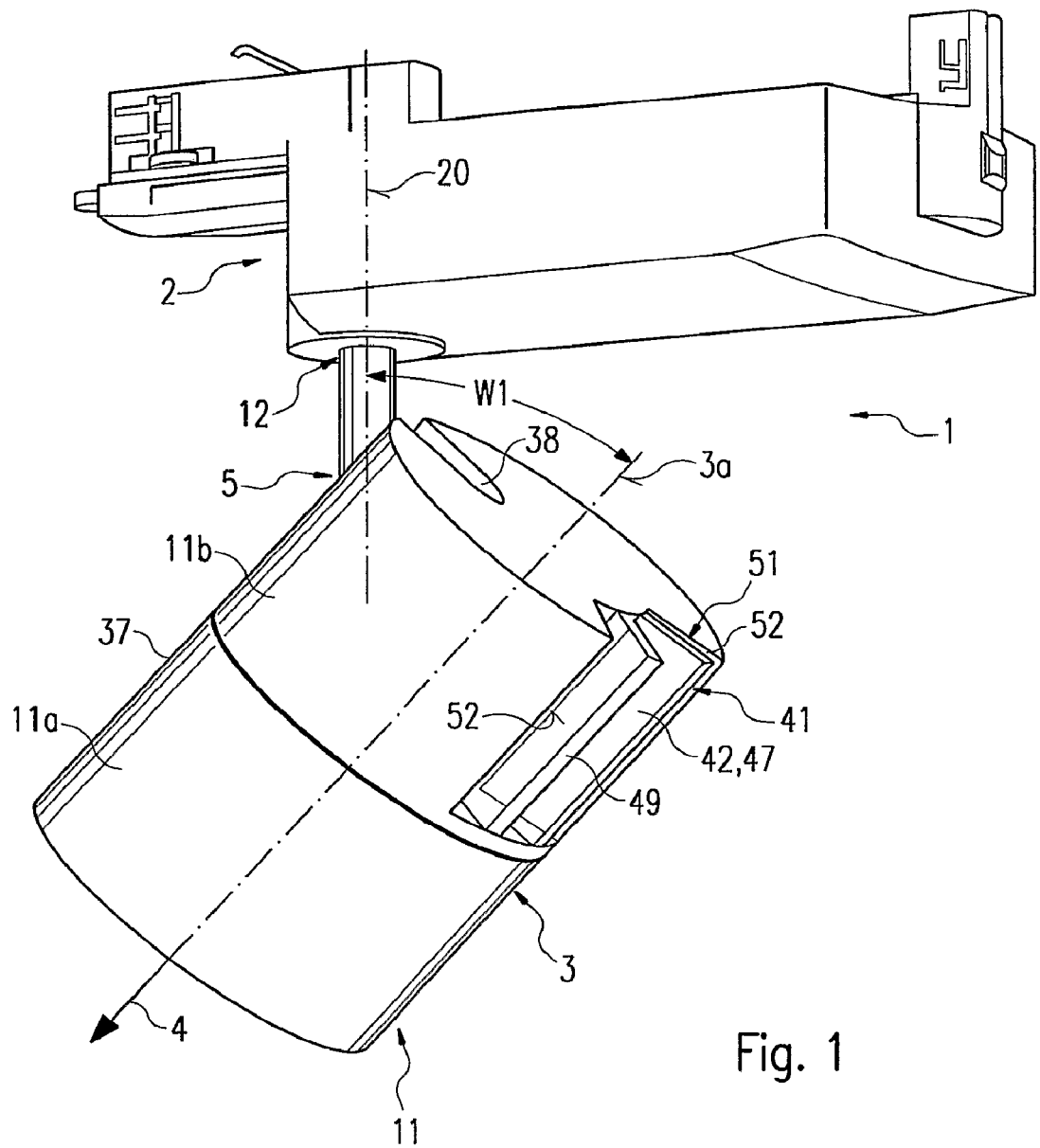
FIG. 1 shows a perspective side view of a luminaire according to the invention, comprising a spotlight and an adjustable holding device for the spotlight.

The main parts of the luminaire, denoted in its entirety by 1, are a base part 2 for mounting the luminaire 1 onto a support such as a device, ceiling or wall, a spotlight 3, from which the light is radiated in a main radiation direction 4 when in the switched-on state, and an adjustable holding device 5, by means of which the spotlight 3 is connected to the base part 2 and is thereby carried in an adjustable manner.

The adjustable holding device 5 consists of a carrying element 6 which is attached to the base part 2, a holding element 7 on which the spotlight 3 is held, an articulated joint 8 between the carrying element 6 and the holding element 7, and a clamping device 9 for locking the articulated joint 8 in its respective articulation position. The holding element 7, the articulated joint 8 and the clamping device 9 are located in a spotlight housing 11, and are therefore not visible in FIG. 1, but are visible in FIGS. 2 to 5.

In the case of the exemplary embodiment, the carrying element 6 is an oblong component, e.g. a rod with, in particular, a round cross-section, preferably a tube, which is inserted in an approximately vertical hole 12 in the base part 2 that opens out on the underside of the latter, said carrying element being attached in a manner not represented. The tubular carrying element 6 may have a key width 13 in its free end region.

The articulated joint 8 is preferably a ball-and-socket joint having an articulated-joint ball 14 which is attached to the end of the tubular carrying element 6 that faces away from the base part 2, the diameter of the ball being greater than the diameter of the tubular carrying element 6. The articulated-joint ball 14 has a through-hole 15 which is coaxial with the tubular form and which, with the cavity of the tubular carrying element 6, constitutes a cable duct through which at least one electric power cable, not represented, can extend to the light source disposed in the spotlight housing 11, or to an electrical connection part of said light source.

Figure 4:
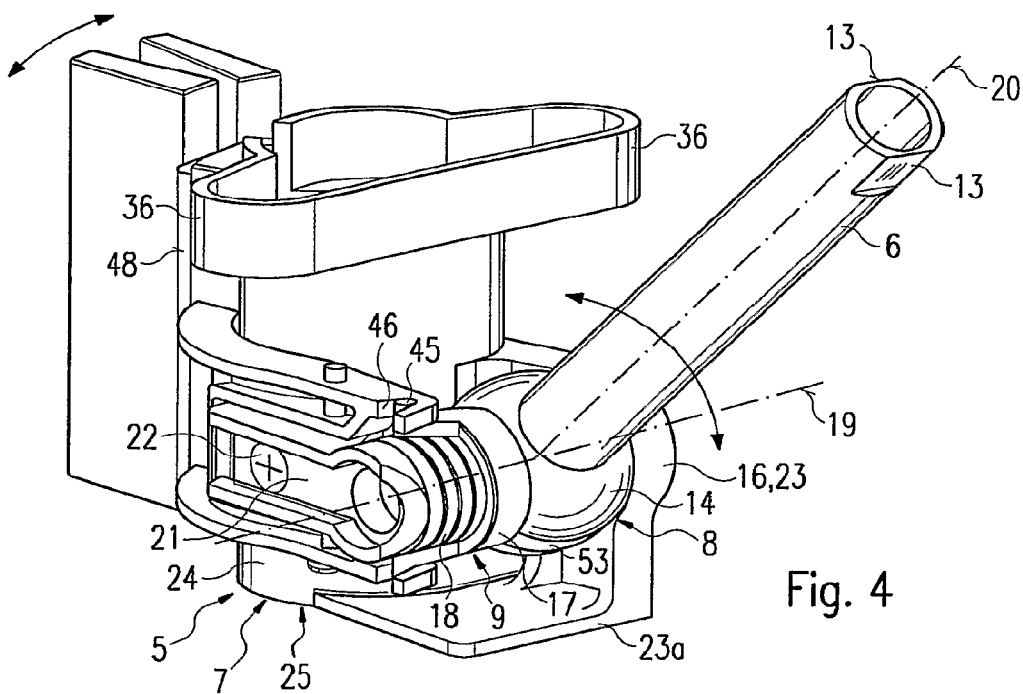
FIG. 4 shows a perspective representation of the holding device.

The articulated joint 8 is constituted by the articulated-joint ball 14 and two articulated-joint shells 16, 17 which are disposed on either side of the articulated-joint ball 14, and of which the articulated-joint shell 17 that is at the front in FIG. 4 is biased against the articulated-joint ball 14 by a spring 18, in particular a helical compression spring. Owing to the friction produced between the articulated-joint shells 16, 17 and the articulated-joint ball 14, this biasing causes the articulated joint 8 to be locked in the respective articulation position.

By means of their shell recesses, which have the form of a portion of the ball and in which the articulated-joint ball 14 sits, the articulated joint shells 16, 17 define a first articulation axis 19, which extends coaxially with the articulated joint shells 16, 17. The spring 18, which is likewise disposed coaxially with the articulation axis 19, is supported coaxially at its other end on an articulated-joint web 21 which, when the spotlight 3 is in the vertical starting position represented in FIGS. 2 and 3, extends horizontally from the holding element 7 onto which it is releasably screwed, e.g. by means of a screw 22. A second articulation axis 20 is constituted by the longitudinal central axis of the carrying element 6, which central axis also extends through the articulation axis 19.

The opposing articulated-joint-shell 16 may be realized as a single piece with an articulated-joint 23 web which is disposed on that side and which, for example, likewise extends as a single piece from the holding element 7 and, with the articulated-joint web 21, constitutes an articulated-joint fork. The articulated-joint web 23 can be stabilized at its lower edge by a horizontal reinforcement web 23a which is formed integrally as a single piece on said articulated-joint web and the holding element 7.

In the case of the present exemplary embodiment, the holding element 7 is a sleeve-type receptacle body 24 whose horizontal cross-section is of circular form in the starting position shown in FIGS. 2 and 3, and which has a downwardly open plug-in socket 25 into which a plug-in cap 26 can be inserted from beneath in a clamping manner, a parabolic reflector 27 being fitted on said plug-in cap, and the latter being able to carry a light source 28 disposed in the cavity of the reflector 27, or to be constituted by the latter. The reflector 27 is located in the lower region of the spotlight housing 11, being able to be inserted therein from above and to bear on a bearing web 29 disposed at the lower edge.

In the case of the present exemplary embodiment, the spotlight housing 11 consists of a lower housing part 11a and an upper housing part 11b, which is realized with an upper-side top wall 31 in the form of a cap. The housing parts 11a, 11b can be fitted together and attached to one another in the region of their mutually facing edges. For this purpose, the one housing part may have in its edge region an outer annular groove 32, and the other housing part may have an inner annular groove 33, which can be inserted into one another so as to fit together, such that the two circumferential wall portions 34, 35, which are of reduced diameter in the region of the annular grooves 32, 33, overlap one another. In their mutually facing edge regions, the housing parts 11a, 11b can be releasably connected to one another by a connecting device, not represented in detail, preferably a quick-closing connection, e.g. a latching device or a bayonet fixing.

The holding element 7 is disposed and positioned, e.g. positively, in the spotlight housing, in this case essentially in the upper housing part 11b. There may be integrally formed on the upper end of the receptacle body 24 one or more flange parts 36 which, in order to save weight, can be realized as hollow parts, and which can be used, for example, to position, and also to fasten, the holding element 7 in the spotlight housing 11.

Figure 5:
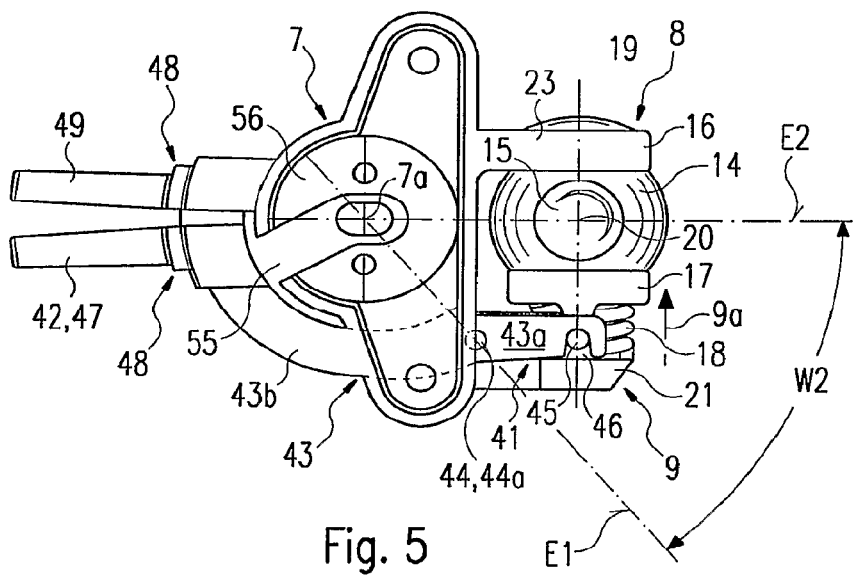
FIG. 5 shows a top view of the holding device.

As shown by FIGS. 4 and 5 in particular, the articulated joint 8 is located on the outside of the sleeve-type circumferential wall of the receptacle body 24. At this location, there is sufficient free space for a pivoting motion of the holding device 5 relative to the carrying element 6 and for a relatively large angle W1 of, for example, approximately 90°, or for an obtuse angle W1, as shown exemplarily by FIG. 3.

The holding device 5 fits, with the articulated joint 8, into the free cavity of the spotlight housing 11, or of the upper housing part 11b, there being disposed in the circumferential wall 37 and in the top wall 31 a slot 38 which is wider than the cross-sectional dimension of the tubular carrying element 6. In the top wall 31, the slot end corresponds to the upright position of the tubular holding element 6, and in the circumferential wall 37 the slot end corresponds to the position of the tubular carrying element 6 of the opposite angular position of the, for example, obtuse angle W1 as shown in FIG. 3. When the luminaire 1 is in the mounted position shown in FIG. 1, the spotlight 3 can thus be pivoted with its main radiation direction 4 such that, when the main radiation direction 4 is in the downwardly pivoted position, its central axis 3a runs approximately parallel to the vertical second articulation axis 20 and, when in the other pivot position with the main radiation direction 4 directed sideways, it encloses an acute to obtuse angle W1 with the second articulation axis 20. In the position shown in FIG. 1, this angle W1, in which the main radiation direction 4 is directed obliquely downwards, is an acute angle. In the case of a right angle or obtuse angle W1, the main radiation direction 4 is directed horizontally or obliquely upwards, these not being represented.

The clamping force of the spring 18 or clamping device 9 is of such magnitude that, on the one hand, the spotlight 3 is locked against unintentional adjustment in each set position. In this case, adjustment can be effected with easy manipulation, by manually applying force to overcome the friction produced by the clamping force 9a.

The luminaire 1 described thus far has the disadvantages that, on the one hand, force must be applied manually to overcome the clamping force and, on the other hand, wear occurs in the articulated joint in the case of such application. In order to avoid these disadvantages, the holding device 5 has a release device 41 with a manually actuated actuating element 42 by means of which the clamping force of the clamping device 9 can be reduced or fully removed, such that the adjustment of the spotlight 3 can be effected, on the one hand, in a more easily manipulated manner with a small amount of force and, on the other hand, without wear in the articulated joint 8 resulting from the clamping force.

In the case of the exemplary embodiment, the release device 41 acts upon the clamping element which is biased against the articulated-joint ball 14 by the force of the spring 18, said clamping element being constituted here by the articulated-joint shell 17. Upon actuation of the release device 41, force is applied to the articulated-joint shell 17 against the force of the spring 18, this resulting in reduction of the clamping force. When the articulated-joint shell 17 is lifted off, the clamping force is removed fully.

In the case of the exemplary embodiment, the release device 41 has a double-armed release lever 43, which extends on the circumference of the holding element 7, in this case the receptacle body 24, at right angles to the central axis 7a of the holding element and, close to the circumference of the holding element 7, is mounted in an articulated joint 44 so as to be pivotable about an articulation axis 44a such that its lever arm 43a facing towards the clamping device 9 can be moved along the direction of action of the clamping element of the clamping device. In the case of the exemplary embodiment, the articulation axis 44a extends in parallel to the central axis 7a of the holding element 7, the lever arm 43a extending at right angles to the first articulation axis 19 and acting upon the articulation-joint shell 17. Preferably two fork-type lever arms 43a are provided, which are disposed on the lower and upper side of the articulation-joint web 21 and are pivotally mounted on an articulation pin which passes through the articulation-joint web 21. The free ends of the lever arms 43a are each connected to the articulated-joint shell 17 by a stud joint. In the case of the exemplary embodiment, mutually opposing driving pins 45 project from the articulated-joint shell 17, the lever arms 43a engaging behind said driving pins, which preferably have recesses 46 which are open in the direction opposite to the clamping direction 9a.

As viewed in the top view shown in FIG. 5, the articulated joint 44 is located in a plane E1 which includes the central axis 7a of the holding element 7 and which, with a plane E2 which includes the central axis 7a and the second articulation axis 20, encloses an acute angle W2 of approximately 45°.

From the articulated joint 44, a long lever arm 43b extends to that side of the holding element 7 which is opposite the articulated joint 8, said lever arm preferably following the curvature of the receptacle body 24 and thus rendering possible a small structure. At the free end of the lever arm 43b there is an actuating element 42, in the form of an upright web 47 projecting to the side opposite the articulated joint 8, said web being releasably connected to the free end of the long lever arm 43b by a connecting device 48, e.g. a slip joint. Actuation by application of pressure in parallel to the clamping direction 9a causes the articulated-joint shell 17 to be moved contrary to the spring 18, as a result of which the clamping effect is reduced or removed.

In order to further simplify actuation, there is disposed opposite the web 47, at a distance, a supporting web 49, which projects from the holding element 7, in this case from the receptacle body 24, and which, for example, is likewise releasably connected by a connecting device 48 to the holding element 7 or to an attachment thereof. The supporting web 49 provides for easily manipulated actuation of the actuating element 42 in that the web 47 is pressed against the supporting web 49, e.g. by two fingers of an operating hand. This renders possible convenient single-handed operation, it being possible to simultaneously pivot the spotlight 3.

Provided in the spotlight housing 11, in this case in the upper housing part 11b, in particular in the side opposite the articulated joint 8, is a, for example, quadrangular aperture 51, through which the web 47 or also—if provided—the supporting web 49 extends outwards to such an extent that said webs can be manually accessed and actuated from the outside. It is thereby possible for the holding device 5 to be completely covered and protected in a housing, in this case the spotlight housing 11. In addition, this covering also gives the luminaire 1 a good appearance, as an enhancement.

In order, additionally, further to improve the appearance of the luminaire, it is advantageous for the aperture 51 to be realized as a whole, or as an aperture 51a widened in a step formation, in such a size that there is sufficient free space 52 (FIG. 1) between the sides of the webs 47, 49 facing away from one another to permit gripping during actuation, e.g. with the two fingers of the operating hand. In the case of such a design, the webs 47, 49 can end within the aperture 51, and need not project beyond the circumference of the spotlight housing 11.

Figure 6:
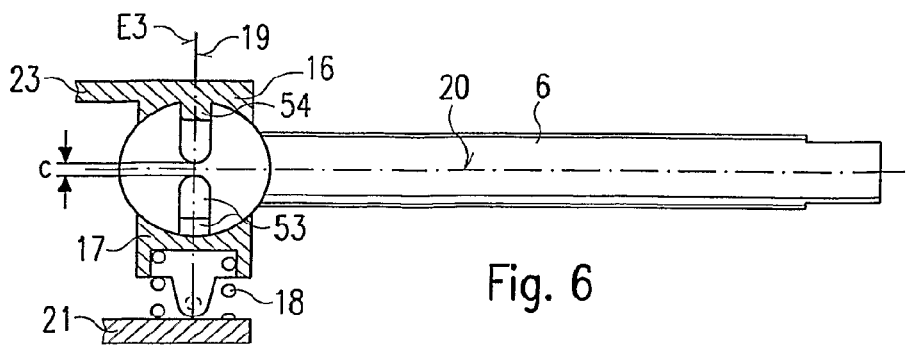
FIG. 6 shows a top view, in partial section, of an articulated joint of the holding device.

In order to prevent the cable, not represented, that extends through the tubular carrying element 6 from undergoing excessive rotation during rotation of the spotlight 3 about the second articulation axis 20, it is advantageous to limit the extent to which the articulated joint 8 can be rotated about this second articulation axis 20. This is achieved in that there is disposed in the articulated-joint ball 14, in a plane E3 extending at right angles to the second articulation axis 20, a groove 53 in which there engages a stud 54 of one of the articulated-joint shells, in this case the articulated-joint shell 16. As can be seen from FIG. 6, the groove 53 is not a full-perimeter groove, but extends over an angular range of less than 360°, such that its ends are at the distance c from one another shown in FIG. 6.

The at least one connecting device 48 is provided to facilitate or render possible mounting of the holding device 5 in the spotlight housing 11. It is therefore possible to mount the holding device 5 in the spotlight housing 11 without the web or webs 47, 49, and to mount the web or webs 47, 49 from the outside following assembly.

The arrangement of the supporting web 49 has the further advantage not only that the operating hand is able to grip both webs 47, 49 in an easily manipulated manner and actuate the release device 41, but that secure gripping of the spotlight 3 as a whole is achieved, such that the latter can be pivoted into the desired radiation direction (FIG. 4). Following release of the web 47, the force of the spring 18 causes the clamping device 9 to go automatically into its clamping position, in which it locks the spotlight 3.

On the side opposite the articulated joint 8, the circumferential wall of the receptacle body 24 may have a continuous vertical slot 55 which, in the case of provision of an upper transverse wall 56, may extend into the central region of the latter. The slot 55 may serve, for example, for the lateral insertion of an electric cable. The slot 55 is located, in particular, in the end region of the longer lever arm 43b. Owing to the laterally open recesses 46, it is therefore possible for the double lever 43 in FIG. 5 to be pivoted downwards, in which case it releases the slot 55 for access. This is possible because, owing to the open recesses 46, the short lever arm or arms 43a are able to pivot at the same time towards the plane E2 and to pivot back to the driving pin 45.

The invention claimed is:

1. A luminaire (1) comprising a spotlight (3), and comprising an adjustable holding device (5) by means of which the spotlight (3) is connected to a base part (2) of the luminaire (1), wherein the holding device (5) has an oblong carrying element (6), a holding element (7) at least for a portion of the spotlight (3), an articulated joint (8) between the carrying element (6) and the holding element (7), and a clamping device (9) for locking the articulated joint (8), the articulated joint (8) and the clamping device (9) being disposed in a spotlight housing (11), there furthermore being disposed in the spotlight housing (11) a release device (41) by means of which the clamping force of the clamping device (9) can be reduced or removed, and the release device (41) being accessible from outside the spotlight housing (11) in order that it can be operated manually, wherein the release device (41) extends through an aperture (51) in the spotlight housing (11) and has a manually operated actuating element (42) in the region of the aperture (51), and a supporting element (49) rigidly connected to the housing is disposed at a distance next to the actuating element (42), the actuating element (42) being movable towards the supporting element (49) in that both elements (42, 49) are gripped together by two fingers of an operating hand.

2. A luminaire according to claim 1, wherein the carrying element (6) extends through a slot (38) in the spotlight housing (11), said slot, being continuous in a side wall of the spotlight housing (11) in the pivoting plane of the articulated joint (8), extending as far as into a top wall (31) of the spotlight housing (11) that faces away from a direction (4) of a light radiation of the spotlight (3).

3. A luminaire according to claim 1, wherein the articulated joint (8) permits adjustment about at least two axes (19, 20), and means (42) are provided for manually releasing the clamping device (9) without use of tools only for the time of adjustment of the articulated joint (8).

4. An adjustable holding device (5) for a spotlight (3), comprising a carrying element (6), a holding element (7) at least for a portion of the spotlight (3), an articulated joint (8) between the carrying element (2) and the holding element (7), and a clamping device (6) for locking the articulated joint (5) in its respective articulation position, wherein the articulated joint (5) permits adjustment about at least two axes (19, 20), and a release means (41) being provided for manually releasing the clamping device (9) without use of tools only for the time of adjustment of the articulated joint (8), wherein the release device (41) extends through an aperture (51) in a spotlight housing (11) and has a manually operated actuating element (42) in the region of the aperture (51), and a supporting element (49) which is solid with rigidly connected to the housing is disposed at a distance next to the actuating element (42), the actuating element (42) being movable towards the supporting element (49) in that both elements (42, 49) are gripped together by two fingers of an operating hand.

5. A holding device according to claim 4, wherein the carrying element (6) extends through a slot (38) in the spotlight housing (11), said slot, being continuous in a side wall of the spotlight housing (11) in the pivoting plane of the articulated joint (8), extending as far as into a top wall (31) of the spotlight housing (11) that faces away from a direction (4) of a light radiation of the spotlight (3).

6. A luminaire according to claim 1, wherein the articulated joint (8) is disposed on one side of the holding element (7) and the actuating element (42) is disposed on the opposite side of the holding element (7).

7. A luminaire according to claim 1, wherein the aperture (51) forms a first space (52) between it and the actuating element (42) and a second space (52) between it and the supporting element (49), such that a finger can be inserted in each space (52).

8. A luminaire according to claim 6, wherein the release device (41) has a double-armed release lever (43) which is mounted so as to be pivotable about a lever articulated joint (44), and the actuating element (42) is disposed at the end of the one lever arm (43b) and the other lever arm (43a) cooperates with a clamping part of the clamping device (9).

9. A luminaire according to claim 8, wherein the lever articulated joint (44) is disposed on the side of the holding element (7) on which the articulated joint (8) is located.

10. A luminaire according to claim 1, wherein the holding element (7) is constituted by a sleeve-type receptacle body (24), which preferably has a transverse wall in one of its end regions.

11. A luminaire according to claim 8, wherein the holding element (7) has a round cross-sectional form, and the lever arm (43a) carrying the actuating element (42) is curved to follow the curvature of the holding element (7).

12. A luminaire according to claim 1, wherein the carrying element (6) is a rod, preferably a tube.

13. A luminaire according to claim 8, wherein the articulated joint (8) has an articulated-joint ball (14) which is attached to the facing end of the carrying element (6) and which cooperates in a clamping manner with two articulated-joint shells (16, 17) disposed on mutually opposing sides of the articulated-joint ball (14).

14. A luminaire according to claim 13, wherein the articulated-joint ball (14) has a through-hole (15) in alignment with the tube.

15. A luminaire according to claim 13, wherein one of the two articulated joint shells (17) is mounted so as to be movable, and is biased by the force of a spring (18) against the articulated-joint ball (14).

16. A luminaire according to claim 15, wherein the articulated-joint shell (17) biased by the spring force can be moved against the direction of action of the spring (18) by actuation of the release device (41) or of the means.

17. A luminaire according to claim 3, wherein the two axes (19, 20) run essentially at right angles to each other, and preferably the one axis (19) is defined by the common central axis of the articulated-joint shells (16, 17) and the other axis (20) is defined by the longitudinal axis of the carrying element (6).

18. A luminaire according to claim 13, wherein the extent to which the articulated joint ball (14) can rotate in the articulated joint (8) is limited to a rotational angle which is less than 360°.

19. A luminaire according to claim 18, wherein the articulated-joint ball (14) has a groove (53) in a plane extending at right angles to the central axis of the carrying element (6), said groove extending over an angle which is less than 360°, and there is engaged in the groove a stud (54) which is indirectly firmly connected to the holding element (7) and preferably projects from the articulated joint shell (16) disposed on the side of the articulated joint ball (14) that is opposite the spring (18).

* * * * *